M. S. TOWSON.
MOTOR VEHICLE.
APPLICATION FILED SEPT. 29, 1911.
1,112,173.
Patented Sept. 29, 1914.
3 SHEETS—SHEET 3.
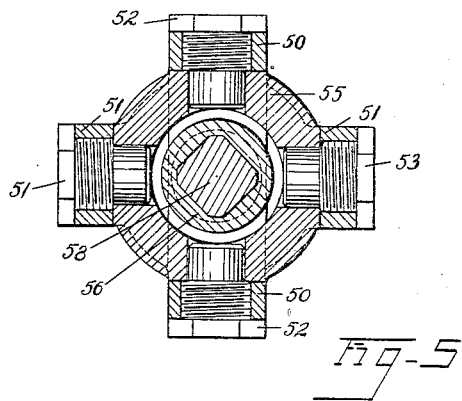
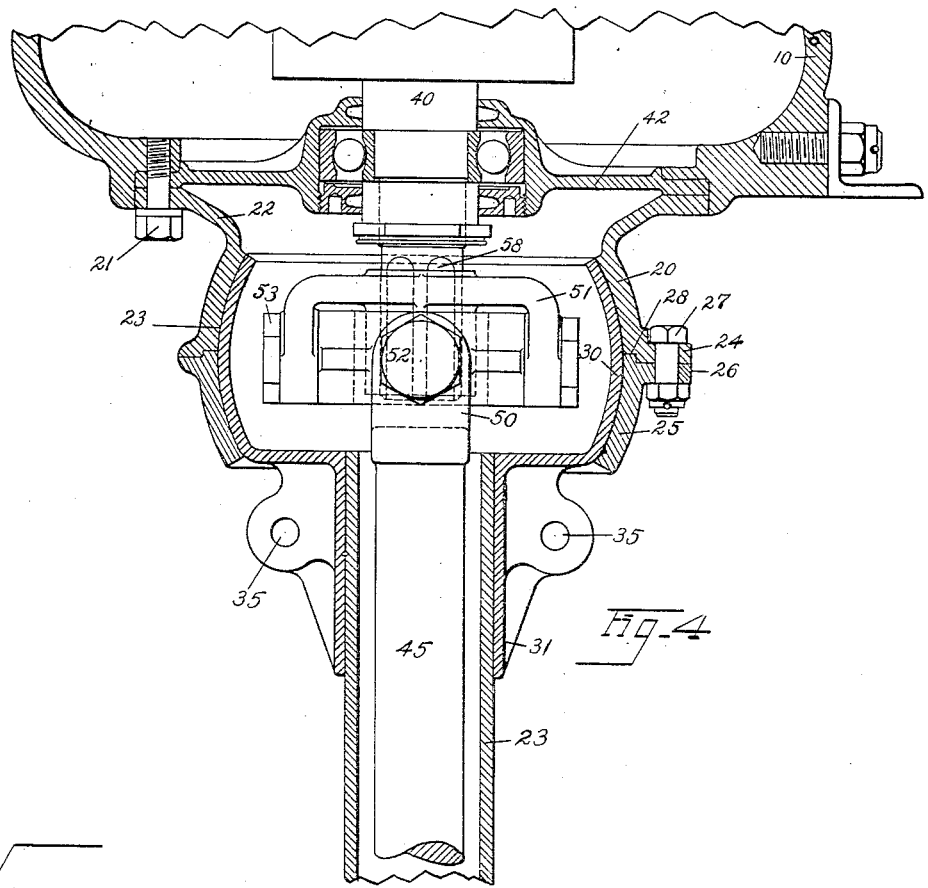

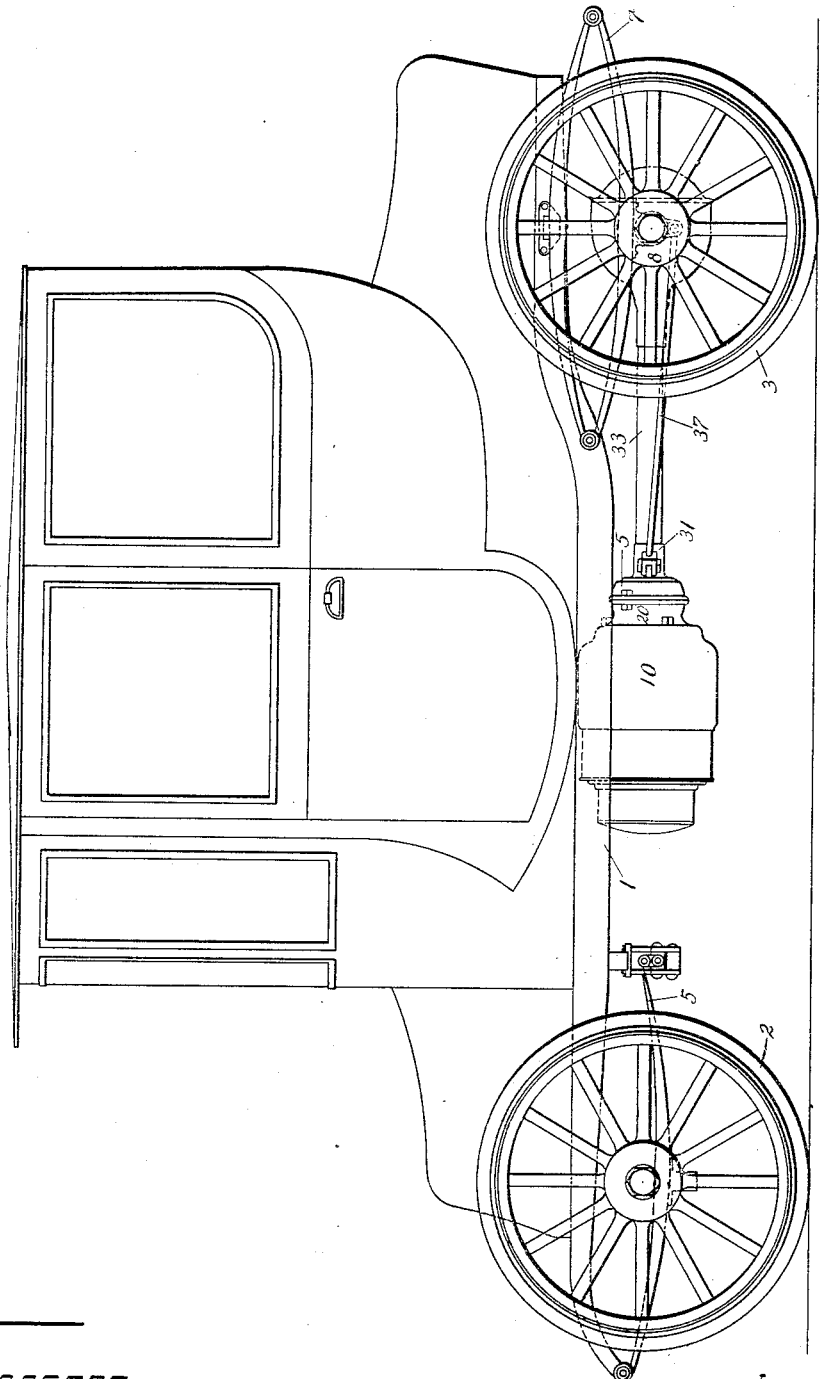

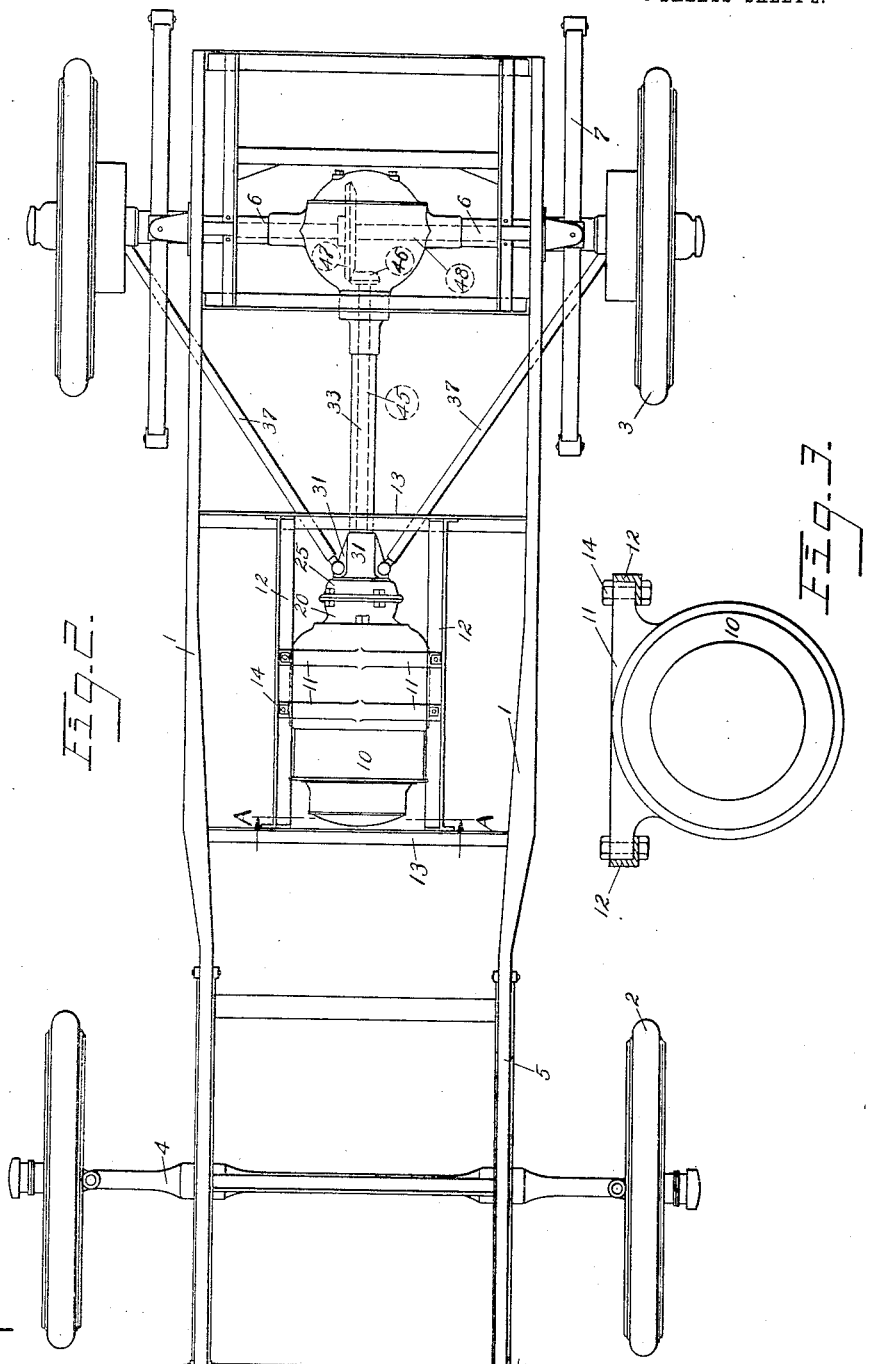

UNITED STATES PATENT OFFICE.

MORRIS S. TOWSON, OF CLEVELAND, OHIO, ASSIGNOR, BY MESNE ASSIGNMENTS, TO THE ELWELL-PARKER ELECTRIC COMPANY, OF CLEVELAND, OHIO, A CORPORATION OF OHIO.

MOTOR-VEHICLE.

1,112,173.  Specification of Letters Patent.  Patented Sept. 29, 1914.

Application filed September 29, 1911. Serial No. 651,919.

*To all whom it may concern:*

Be it known that I, MORRIS S. TOWSON, a citizen of the United States, residing at Cleveland, in the county of Cuyahoga and State of Ohio, have invented a certain new and useful Improvement in Motor-Vehicles, of which the following is a full, clear, and exact description, reference being had to the accompanying drawings.

The object of this invention is to provide a simple and effective means of suspending the motor of an electric motor vehicle and connecting it with the driving axle. To this end I provide an electric motor rigidly carried by the frame or body of the vehicle and having its armature shaft substantially in the horizontal plane of the live axle sections; I connect this armature shaft by means of a universal joint with a propeller shaft coacting at its rear end with the differential mechanism of the live axle sections, and I surround the propeller shaft with a housing connected at its rear end with the housing for the differential mechanism and at its front end having a hollow ball and socket connection with the motor frame around the universal joint.

The invention consists in such a combination, and also more specifically in the particular embodiment thereof herein shown and hereinafter more fully described.

In the drawings, Figure 1 is a side elevation of a motor vehicle embodying my invention; Fig. 2 is a plan of the chassis of such vehicle; Fig. 3 is an enlarged end view of the motor sectioned through the supporting bars therefor, as indicated by the line A—A on Fig. 2; Fig. 4 is an enlarged horizontal section through the axis of the motor; Fig. 5 is a transverse vertical section through the universal joint connecting the armature shaft with the propeller shaft.

As shown in Figs. 1 and 2, 1 represents the frame of the chassis or vehicle, 2 and 3 the front and rear wheels, 4 the stationary portion of the front axle, 5 the springs connecting the same with the chassis frame, 6 the housings of the rear axle sections, and 7 the springs connecting them with the frame, these springs having seats 8 on the rear axle housings, which allow the housings to turn within the seats.

10 indicates the motor frame or casing, which is shown as a barrel-like member having projecting ears 11 preferably integral with the frame, which extend over and rest upon the longitudinal bars 12, which are connected with the cross bars 13 connected with the side members of the frame. These bars 12 may well be of angle-iron form, and the ears 11 bolted to the horizontal flanges by bolts 14, as shown particularly in Fig. 3.

Secured to the rear end of the motor is an annular member 20. This member is shown as bolted to the motor casing by bolts 21 and then extends inwardly, as shown at 22, and then flares outwardly having a partially spherical internal seat 23. The extreme end of such spherical portions is provided with an outward bead and ears 24. Seating against the end of the member 20 is a ring 25 which is also partially spherical internally and has an annular bead and outward ears 26. This ring 25 is normally secured in place by bolts 27 occupying the ears 24 and 26. The two members 25 and 20 are definitely located with reference to each other by a rib 28 on one seating in a rabbet on the other.

Within the spherical recess provided by the members 20 and 25 is a partially spherical hollow head 30 formed with a tubular extension 31. This extension extends over and is rigidly secured to a tube 33 which extends longitudinally of the vehicle and is secured at its rear end to the housing 34 of the differential mechanism, this housing being connected with the housings 6 of the live axle sections. On opposite sides of the tubular extension 31 are formed ears 35. Suitable diagonal rods 37 are connected at their forward ends to these ears and at their rear ends to the housings 6, preferably to ears on the under sides of these housings.

From the construction described it will be seen that the housings of the live axle sections, the housing of the differential, the fore-and-aft housing, the spherical head thereon and the diagonal braces all constitute in effect a unitary member having a ball and socket joint with the motor casing. As the vehicle body and the wheels approach or recede from each other in travel, the composite housing described swings about the center of the spherical head 30, and this head turns in the spherical socket, provided by the members 20 and 23, in any direction required.

40, in Fig. 4, represents the armature shaft. This shaft is journaled in ball bearings, one of which is shown at 41 near the rear end of the motor, the same being carried by an end plate 42, which is shown as bolted to the motor casing 10 by the same bolts 21 which secure the flaring extension 20. This armature shaft is connected by a universal joint with the propeller shaft 45, which occupies the housing 33 and, at its rear end, is provided with a pinion 46 meshing with the main gear 47 of the differential mechanism connected with the live axle sections 48, such parts being shown in dotted lines in Fig. 2.

The universal joint consists of a yoke 50 secured to the propeller shaft 45, a corresponding yoke 51 at right angles to the yoke 50 and connected with the armature shaft, and studs 52 and 53 screwing into the yokes mentioned and having inward projections journaled in a ring 55. The connection of the armature shaft with the yoke 51 is made by a sleeve 56 formed on that yoke which has an angular bore receiving an angular extension 58 of the armature shaft. As shown, the armature shaft and the bore are substantially square in cross section, though other noncircular form may be used if desired.

It will be seen from the above described construction that the armature shaft and propeller shaft may swing out of alinement with each other by reason of the universal joint connected with it while the housing head 30 turns correspondingly within the spherical socket provided by the motor casing, so that the necessary independence of movement is provided between the motor and the driving axles, though the motor is rigidly mounted on the frame. It will be noted also that the propulsive force of the rear wheels is transferred to the body through the tubular housing 33 and the motor frame, thereby relieving the rear springs of this effect and rendering the construction more efficient. The motor casing, together with the housings, entirely inclose the moving parts from the armature to the live axle sections, protecting them from dust and presenting a neat appearance. This neat appearance is increased by the fact that the motor is supported horizontally and in operation the tubular housing 33 is substantially horizontal. It should also be noted that the motor may be very easily removed from the driving mechanism. The removal of the bolts 27 enables the removal of the ring 25. This frees the spherical head 30, and the motor, when its hangers are released, may be drawn away from the spherical head, the armature shaft sliding out of its socket in the sleeve 56, with which it has an easy sliding engagement.

Having thus described my invention, what I claim is:

1. In a motor vehicle, the combination, with a frame, of an electric motor having its axis longitudinal and suspended from the frame in the median line of the vehicle, said motor having on its end a partly spherical extension, a driving axle, a housing surrounding the same, a tube connected with said housing and having at its ends a partly spherical extension engaging and making a ball joint with the spherical extension first mentioned, a propeller shaft in said tube geared with the driving axle, and a universal means within the spherical members connecting the propeller shaft with the armature.

2. In a motor vehicle, the combination, with a chassis frame comprising longitudinal bars, cross bars and intermediate longitudinal bars supported by the cross bars, of an electric motor located centrally of the frame and extending in a fore-and-aft direction and suspended by ears connected to the intermediate longitudinal bars, said motor having a partly spherical housing at its rear end, a driving axle, a housing surrounding the same, a tubular extension from said housing having a partly spherical forward end mounted in the spherical housing of the motor frame, brace bars leading from the axle housing near its ends forwardly and inwardly and secured at their forward ends to the tubular extension near its forward end, a propelling shaft within the tubular extension, and a universal joint within the spherical members connecting the propelling shaft with the armature shaft.

In testimony whereof, I hereunto affix my signature in the presence of two witnesses.

MORRIS S. TOWSON.

Witnesses:
Geo. M. Bacon,
Hugh B. McGill.